(12) United States Patent
Alban et al.

(10) Patent No.: US 11,498,399 B2
(45) Date of Patent: Nov. 15, 2022

(54) ROLLER BLIND SYSTEM FOR A VEHICLE ROOF

(71) Applicant: Webasto SE, Stockdorf (DE)

(72) Inventors: Vasile-Marius Alban, Stockdorf (DE); Werner Winkler, Stockdorf (DE); Constantin Ardelean, Stockdorf (DE); Andrei Popovici, Stockdorf (DE); Josef Haas, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 357 days.

(21) Appl. No.: 16/645,723

(22) PCT Filed: Sep. 27, 2018

(86) PCT No.: PCT/EP2018/076282
§ 371 (c)(1),
(2) Date: Mar. 9, 2020

(87) PCT Pub. No.: WO2019/063702
PCT Pub. Date: Apr. 4, 2019

(65) Prior Publication Data
US 2020/0282814 A1 Sep. 10, 2020

(30) Foreign Application Priority Data
Sep. 27, 2017 (DE) .................. 10 2017 122 496.3

(51) Int. Cl.
*B60J 7/00* (2006.01)
*B60J 1/20* (2006.01)

(52) U.S. Cl.
CPC ............ *B60J 7/0015* (2013.01); *B60J 1/205* (2013.01); *B60J 1/2025* (2013.01); *B60J 1/2044* (2013.01); *B60J 1/2052* (2013.01); *B60J 1/2069* (2013.01)

(58) Field of Classification Search
CPC ...... B60J 7/0015; B60J 1/2069; B60J 1/2025; B60J 1/2044; B60J 1/205; B60J 1/2052; B60J 1/2016
(Continued)

(56) References Cited

U.S. PATENT DOCUMENTS 8,511,735 B2 * 8/2013 Lee .................. B60J 7/0573
296/97.4
8,678,488 B1 * 3/2014 Kim .................. B60J 7/0015
296/214
(Continued)

FOREIGN PATENT DOCUMENTS

DE 19750715 C1 * 11/1998 ............ B60J 7/0015
DE 19750715 C1 11/1998
(Continued)

OTHER PUBLICATIONS

International Search Report for PCT/EP2018/076282 dated Nov. 6, 2018 in English (5 pages).
(Continued)

*Primary Examiner* — Jason S Morrow
*Assistant Examiner* — Wenwei Zhuo
(74) *Attorney, Agent, or Firm* — Fitch, Even, Tabin & Flannery, LLP

(57) ABSTRACT

The present invention relates to a roller blind system for a vehicle roof, comprising two roller blind assemblies, wherein he roller blind web of the first roller blind assembly is designed to be longer in the extension direction than the roller blind web of the second roller blind assembly. At least one compression-resistant drive cable is provided, a first section of which is firmly attached to a pulling hoop of the first roller blind assembly and a second section of which can be detachably engaged with a pulling hoop of the second roller blind assembly. According to the invention, a locking
(Continued)

Figure 1:
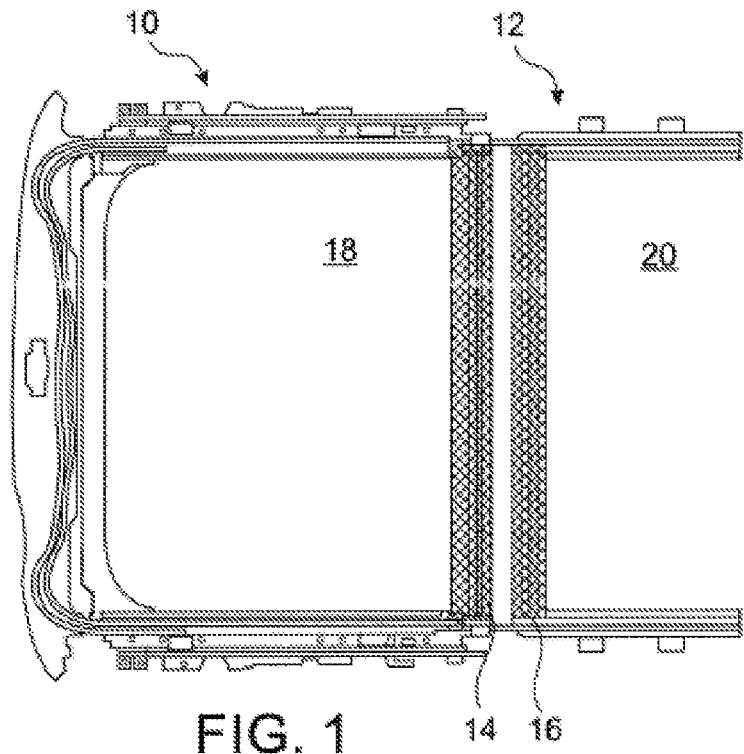

mechanism is provided, which has an elastically deformable clip-on connection, by means of which the second section of the drive cable can be detachably engaged with the pulling hoop of the second roller blind assembly.

27 Claims, 5 Drawing Sheets

(58) Field of Classification Search
USPC .... 160/370.22, DIG. 3; 296/97.4, 97.8, 219, 296/214
See application file for complete search history.

(56) References Cited

U.S. PATENT DOCUMENTS

| | | | |
|---|---|---|---|
| 10,843,541 B2* | 11/2020 | Schreiber | B60J 7/0573 |
| 2007/0221339 A1* | 9/2007 | Elbs | B60J 7/0015 |
| | | | 160/84.02 |
| 2014/0117725 A1* | 5/2014 | Rooijakkers | B60J 7/0573 |
| | | | 296/223 |
| 2014/0246884 A1 | 9/2014 | Nellen | |

FOREIGN PATENT DOCUMENTS

| | | | |
|---|---|---|---|
| DE | 102004020335 A1 | 11/2005 | |
| DE | 102012006848 A1 * | 10/2013 | B60J 7/057 |
| DE | 102012006848 A1 | 10/2013 | |

OTHER PUBLICATIONS

Written Opinion for PCT/EP2018/076282 dated Nov. 6, 2018 in German (15 pages).

* cited by examiner

ROLLER BLIND SYSTEM FOR A VEHICLE ROOF

CROSS-REFERENCE TO RELATED APPLICATIONS

This application is a U.S. national phase application filed under 35 U.S.C. § 371 of International Application No. PCT/EP2018/076282, filed 27 Sep. 2018, designating the United States, which claims priority from German Patent Application No. 10 2017 122 496.3, filed 27 Sep. 2017, which are hereby incorporated herein by reference in their entirety for all purposes.

FIELD

The present invention relates to a roller blind system for a vehicle roof according to the preamble of claim 1.

BACKGROUND

Roller blind systems for vehicle roofs are known, which are provided with two roller blind assemblies. If such a roller blind system is to be driven by a single drive only, but the two roller blind systems have roller blind webs of a different length, provision may be made for the longer roller blind web to be firmly attached to a drive cable, whereas the shorter roller blind web is detachable from the common drive cable. A firm attachment here is understood to mean that the attachment is not disengaged as part of the normal operation of the roller blind system, but only for the purpose of assembly or disassembly, or in the instance of an unusual operating state such as will be described in greater detail below.

A roller blind system of this kind is known from DE 10 2004 020 335 A1. A shorter roller blind web and a longer roller blind web are each unrolled from a corresponding winding shaft by means of two drive cables. A spring assembly is disposed inside the winding shafts by means of which both roller blind webs are wound onto the winding shafts. A coupling mechanism is provided to facilitate the engagement or disengagement of a pulling hoop of the shorter roller blind web to or from the drive cables respectively. The roller blind webs are unrolled into a closed position against the tensile load applied to them by their winding shaft.

The disadvantage of such known roller blind systems is the complex mechanical coupling system, such as is described in DE 10 2004 020 335 A1.

SUMMARY

It is the object of the present invention to provide a roller blind system for a vehicle roof with two roller blind assemblies and roller blind webs of different lengths, which can be manufactured easily and cost-effectively.

Said object is attained according to the invention by a roller blind system according to the characteristic of claim 1.

According to the invention the locking mechanism is provided with an elastically deformable clip-on connection by means of which the second section of the drive cable may be detachably engaged with the pulling hoop of the second roller blind assembly.

This provides the advantage that, through the provision of an elastically deformable clip-on connection, components that are complex to manufacture, such as pawls and guide bars, become superfluous.

Advantageous embodiments of the present invention become apparent from the dependent claims.

The engaged clip-on connection is preferably guided inside a guide channel in a section of the second roller blind assembly, wherein said guide channel is sized at least in part so that the engaged clip-on connection is unable to disengage in this section. This secures the clip-on connection against an unintended disengagement.

In a particularly preferred embodiment of the invention the drive cable remains engaged with its second section with the pulling hoop of the second roller blind assembly in the partially and fully unrolled state of the second roller blind web. This has the advantage of avoiding a stick-slip effect. The stick-slip effect is to be understood as a catch-glide action or a self-excited friction oscillation, which characterizes the stop-go sliding motion of solid bodies that are moved opposite to one another. Because the drive cable always remains connected to the pulling hoop whilst the second roller blind web is moved (and also in the resting state when the second roller blind web is fully unrolled), the drive cable not only supports the unrolling but also the rolling-up of the second roller blind web, which can avoid stick-slip effects.

Two compression-resistant drive cables may be provided, which are jointly driven in opposite direction by the drive, wherein each engages at opposite, lateral ends of the respective pulling hoop via the first or second sections respectively. The use of two drive cables offers the advantage of avoiding a pulling hoop from being canted since the pulling hoops are driven at both lateral sections of the vehicle roof.

The second section is preferably moved in the opposite direction to the first section, and the two roller blind assemblies may be extended in opposite direction to each other.

A particularly preferred embodiment of the present invention results if the first, longer roller blind web is pulled by the drive cable into a closed position with an unrolled, first roller blind web, and is pushed into an open position with a rolled-up, first roller blind web. The second, shorter roller blind web is then preferably pushed by the drive cable into a closed position with an unrolled second roller blind web, and pulled by the drive cable into an open position with rolled-up second roller blind web. This provides the particular advantage that the elastically deformable clip-on connection can be pressed shut through a movement of the drive cable towards the pulling hoop of the shorter roller blind web, and the drive cable applies a force onto the deformable clip-on connection in closing direction. Conversely, in order to open the second roller blind assembly, the pulling hoop of its shorter roller blind web is moved such that a force is applied onto the elastically deformable clip-on connection in opening direction and, when reaching the open position with a completely rolled-up second roller blind web, is disengaged from the same or its pulling hoop respectively, in order to continue to move the first, longer roller blind web. This avoids that the clip-on connection is disengaged due to the greater forces that occur during unrolling of the shorter roller blind web.

In a further preferred embodiment of the invention both winding shafts are preloaded in a rolling-up direction by means of spring elements. This prevents the roller blind webs from sagging and the rolling up of both roller blind webs is made easier.

The elastically deformable clip-on connection is preferably provided with an expansion, which may be received in a seat of the clip-on connection for the purpose of a detachable engagement, wherein the seat is elastically deformed and wherein the seat is preferably an injection-molded plastic part.

The expansion is in this instance preferably disposed on the second section of the drive cable, or is connected with the pulling hoop of the second roller blind assembly, and the seat is provided in form of an elastically expandable opening with an undercut, which is connected with the pulling hoop of the second roller blind assembly or is disposed on the second section of the drive cable.

The engaged clip-on connection is guided inside a guide channel, preferably in a section of the second roller blind assembly, wherein in front of and/or in a first section of the guide channel, which faces the first roller blind assembly, a hollow space is provided that has an opening dimension of a size that allows the clip-on connection to disengage, and the guide channel is of such a size in the second section, which follows the first section, so that the engaged clip-on connection is unable to disengage in this location. In this instance an opening dimension of the second section corresponds preferably essentially to the diameter of the engaged clip-on connection so that the disengaging of the clip-on connection through bending up of the clip fingers radially outwards is prevented. Thus the clip-on connection is secured against an unintended opening in the section beside the second roller blind web, for example through a vibration of the vehicle or a clamping effect. This makes also the installation easier since the clip-on connection is engaged by simply pushing the cables forward.

The elastically deformable clip-on connection is preferably designed such that it can be disengaged under a reversible, elastic deformation through a force that can be applied by the drive.

In a further preferred embodiment of the invention, two compression-resistant drive cables are provided, which are jointly driven by the drive in opposite directions, each of which engages with the opposite, lateral ends of the associated pulling hoop via the first or second sections respectively.

Both drive cables are preferably redirected twice by 90° each, wherein both drive cables together have a U-shaped configuration in top view, and wherein a drive located in the connecting section between the two "flanks" of the U drives the drive cables.

The drive is in this instance disposed preferably on that side of the roller blind system to which the pulling hoop of the first roller blind web is moved when the first roller blind web is unrolled.

In a particularly preferred embodiment of the invention the drive cable is routed in a section between the first roller blind assembly and the second roller blind assembly inside a transition tube. This makes installation easier since the cables need only be passed through the associated transition tube.

The transition tube may be oriented such that it centers the second section of the drive cable in such a way that the clip-on connection is engaged when pushing the drive cables forward in the direction of the second roller blind assembly, which makes installation easier again.

BRIEF DESCRIPTIONS OF THE DRAWINGS

Figure 2:
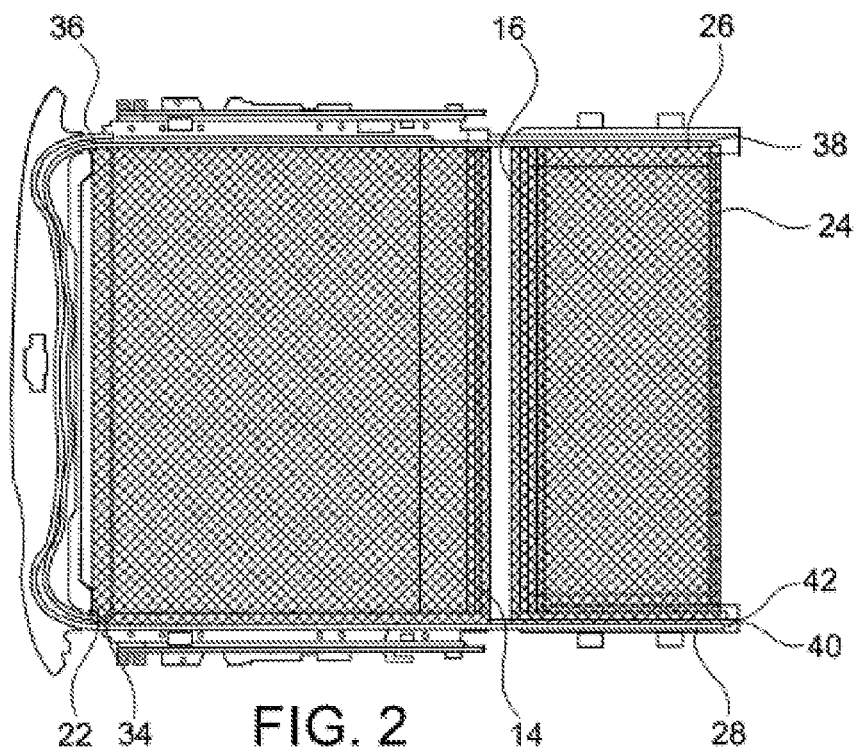
Figure 3:
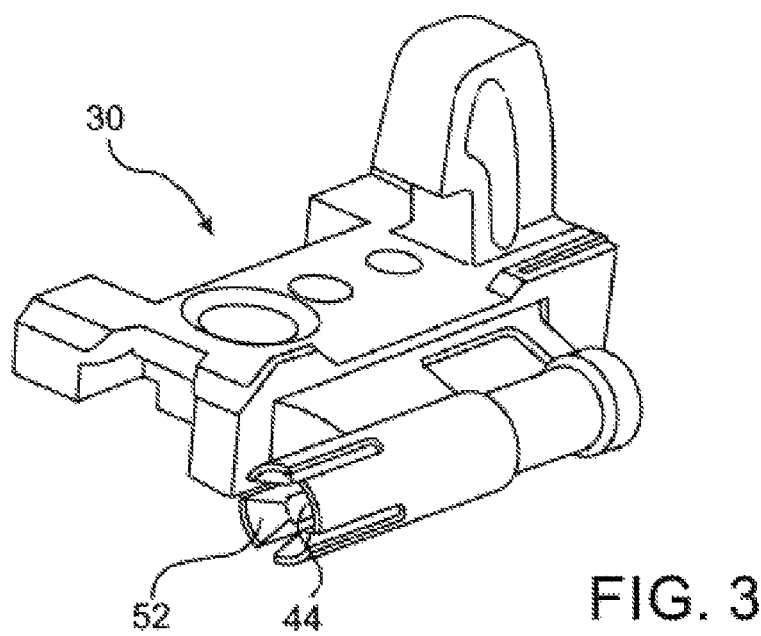
Figure 4:
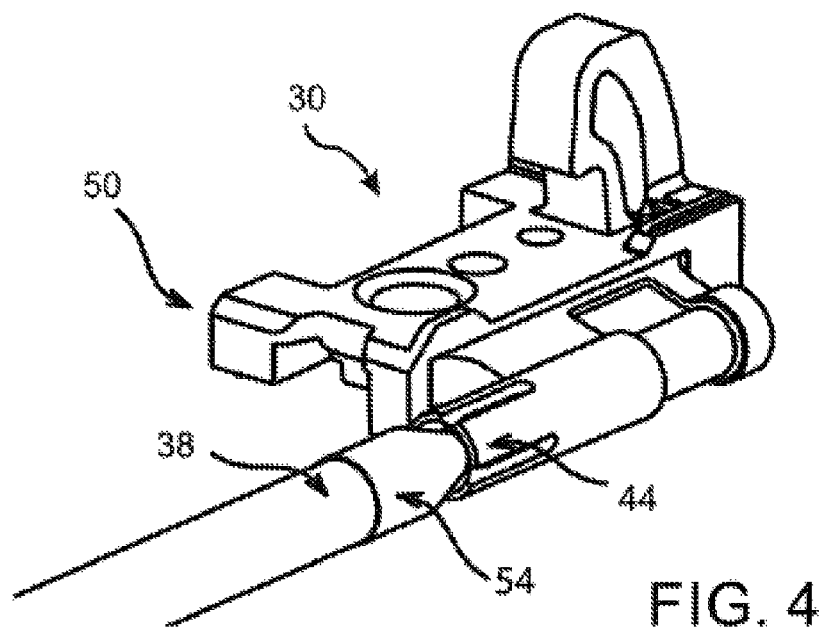
Figure 5:
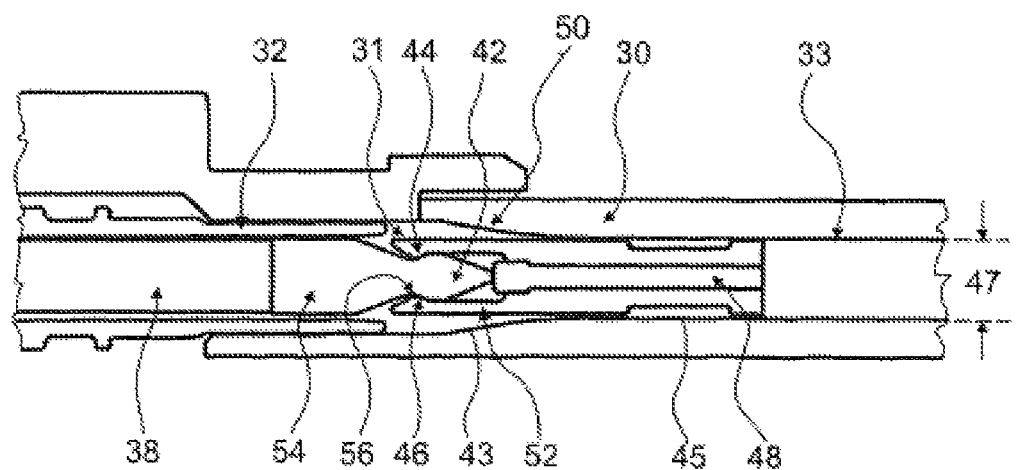
Figure 6:
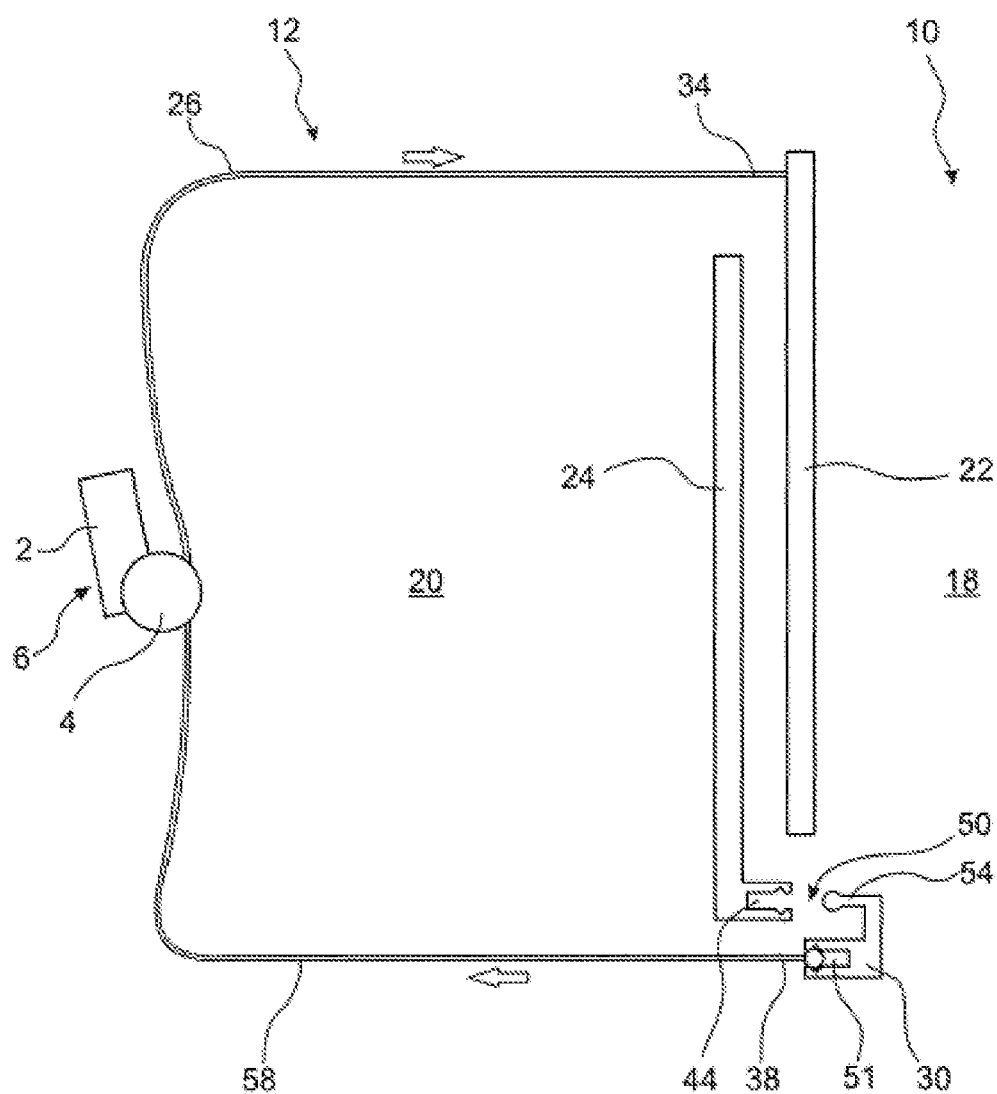
Figure 7:
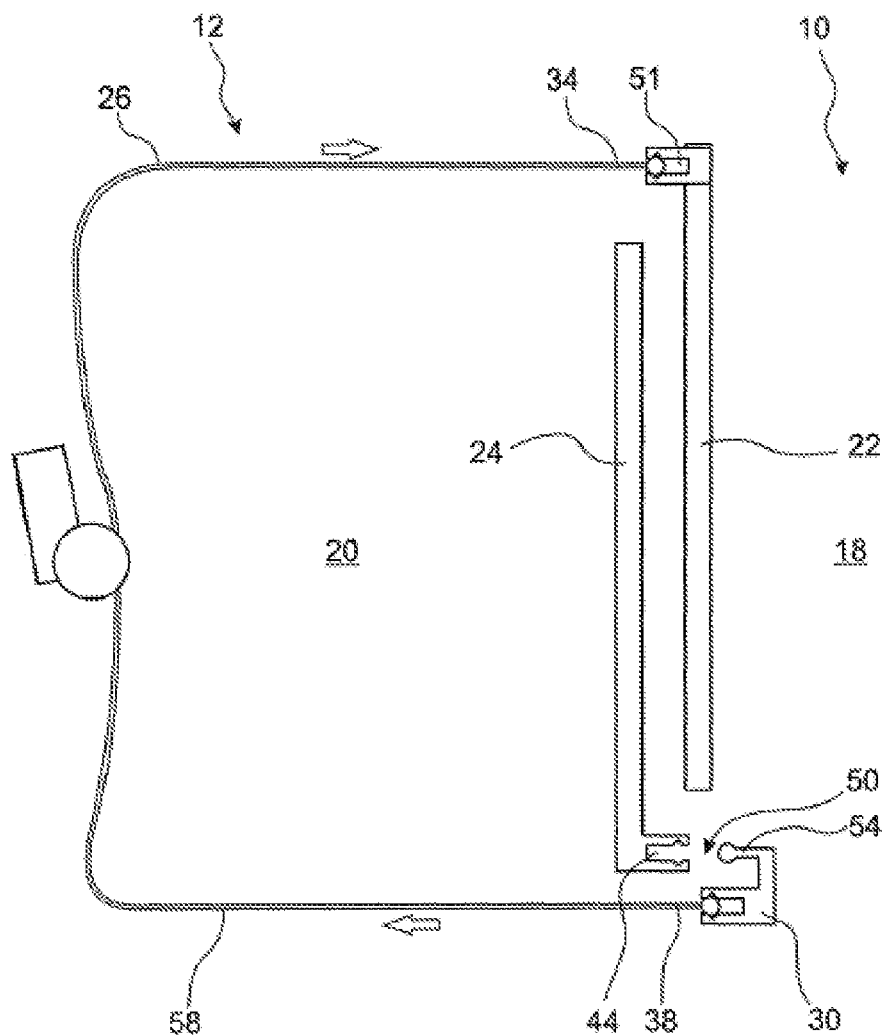

The following describes the invention in greater detail by way of examples shown in the attached figures. Shown are in:

FIG. 1 a roller blind system according to the invention with a first and a second roller blind assembly in an open position;

FIG. 2 the roller blind system of FIG. 1 in a closed position;

FIG. 3 a link to connect a drive cable with a pulling hoop;

FIG. 4 the link of FIG. 3 with a drive cable attached;

FIG. 5 a cross-section through the link or the clip-on connection respectively of FIG. 3 in cross-sectional view; and FIGS. 6, 7 two further roller blind systems according to the invention, wherein here, in contrast to the embodiments of FIGS. 1 and 2, the longer roller blind web is disposed on the right side of the drawing.

DETAILED DESCRIPTION

FIGS. 1 and 2 depict a roller blind system for a vehicle roof with a first and a second roller blind assembly 10 and 12, which are arranged offset to each other in the longitudinal direction of the roof, each of which having an associated winding shaft 14, 16. A roller blind web 18, 20 is assigned to each winding shaft 14, 16, wherein the roller blind web 18 of the first roller blind assembly 10 is longer in extension direction than the roller blind web 20 of the second roller blind assembly 12. A pulling hoop 22, 24 each is disposed at both free ends of the roller blind webs 18 and 20. Two drive cables 26, 28, which are rigid in compression and/or are rigidly guided in compression, are provided, which are firmly attached at the first ends 34, 36 with the pulling hoop 22 of the first roller blind assembly 10. With the two other ends 38, 40 of the drive cables 26, 28 said drive cables 26, 28 can be detachably engaged with the pulling hoop 24 of the second roller blind assembly 12. In the open position shown in FIG. 1 the respective end 38, 40 of the drive cables 26, 28 is disengaged from the pulling hoop 24 of the second roller blind assembly 12.

By disengaging both ends 38, 40 of the drive cables 26, 28 from the pulling hoop 24 of the second roller blind assembly 12 it is ensured that the two drive cables 26, 28 are able to move the first roller blind web 18 via their associated pulling hoops 22 over a greater traversing distance. This is necessary since the first roller blind web 18 is longer in extension direction than the second roller blind web 20 of the second roller blind assembly 12, but only a single drive is provided.

The drive, which is not shown in detail, may be an electric motor which moves the drive cables 26 and 28 via a pinion, wherein said drive cables may take the form of spiral cables.

FIG. 2 depicts the roller blind system of FIG. 1 in a state in which both roller blind webs 18 and 20 are unrolled from their respective winding shafts 14 and 16 so as to close the roller blind system. A closed roller blind system is understood to be one where both roller blind webs 18 and 20 are unrolled from their respective winding shafts 14 and 16 in order to provide shade to the internal space of a vehicle below a glazed roof opening, for example a panorama sun roof.

For the purpose of unrolling the second roller blind web 20, the drive cables 26 and 28, which are not engaged with the pulling hoop 24 of the second roller blind assembly 12 in the open position of FIG. 1, will be engaged with the pulling hoop 24 of the second roller blind assembly 12 after a further traversing distance of the drive cables 26 and 28, which essentially corresponds to the difference in length between the two roller blind webs 18 and 20. This engagement remains intact during the entire unwinding movement of the second roller blind web 20 into the position that corresponds to FIG. 2 and also during a subsequent rolling-up of the second roller blind web 20, by means of which the roller blind system is brought back again into the open position of FIG. 1.

The engagement and disengagement of the two ends 38 and 40 of the two drive cables 26 and 28 with and from the pulling hoop 24 of the second roller blind assembly 12 takes place automatically through a locking mechanism, which is provided with an elastically deformable clip-on connection 50 that is described in detail by way of the further FIGS. 3 to 5.

The elastically deformable clip-on connection 50 is designed such that the two ends 38 and 40 of the drive cable 26 and 28 can be detachably engaged with the pulling hoop 24 of the second roller blind assembly 12.

FIG. 3 depicts a link 30 for connecting the two ends 38 and 40 of the drive cables 26 and 28 with the associated pulling hoop 24 of the second roller blind assembly 12. The link 30 is provided with a seat 44, which in turn is formed by four clip fingers 52. The entire seat 44 is without moving parts that may have to be rotatably or displaceably disposed. Displaceable does not mean an elastic deformation of the seat 44 or the clip fingers 52 respectively.

FIG. 4 depicts the seat 44 of FIG. 3 which, in the representation of FIG. 4, enters into a clip-on connection 50 with the drive cable 26 via its end 38. A corresponding clip-on connection is also provided at the opposite end 40 of the drive cable 28.

The corresponding clip-on connection 50 is shown in FIG. 5 in a cross-sectional view. To form the clip-on connection 50 a clip element 54 is disposed at the end 38 of the drive cable 26. At the end that faces away from the drive cable 26, the clip element 54 features an expansion 42, which may be received by the seat 44 of the link 30. The clip-on connection 50 is established in that the end 38 of the drive cable 26 runs up against the link 30 so that the second roller blind web 20 is unrolled from the associated winding shaft 16 into the closed position. As the clip element 54 runs up against the seat 44 of the link 30, the seat 44 is reversibly elastically deformed in such a way that it receives the expansion 42 like a snap-fit connection and holds it in a positive-locking manner. In this instance the clip fingers 52 of the seat 44 are reversibly bent radially outwards by the expansion 42. Each of the clip fingers 52 is provided with an undercut 46, which is formed by an inward-pointing protrusion. As soon as the expansion 42 has moved past the undercut 46, the clip fingers 52 of the seat 44 spring back and rest against a constriction 56 of the clip element 54, which is disposed between the expansion 42 and the end 38 of the drive cable.

The clip element 54 and the end 38 of the drive cable 28 are guided inside a transition tube 32 in a section between the first roller blind assembly 10 and the second roller blind assembly 12. In the section of the second roller blind assembly 12 the closed clip-on connection 50 is guided inside a guide channel 33. A hollow space 31 is provided between the transition tube 32 and the guide channel 33, wherein said hollow space has an opening dimension of a size that permits the clip-on connection 50 to be opened. The hollow space 31 is formed in that the guide channel 33 is expanded in a first section 43, which faces the transition tube. Moreover, to further enlarge the hollow space 31, the transition tube 32 is disposed so as to leave a gap to a guide rail that forms the guide channel 33. In contrast, the guide channel 33 is of a size in a second section 45, which follows the first section 43, so that the closed clip-on connection 50 is unable to open in the area of the second section 45 of the guide channel 33. The opening dimension 47 of the second section 33 corresponds essentially with the diameter of the closed clip-on connection 50 and the diameter of the drive cables 26, 28 and thus does not permit the opening of the clip-on connection 50 through a radial bending out of the clip fingers 52. Only the hollow space 31 is of a size that permits the clip fingers 52 to be bent outwards. This has the advantage of securing the clip-on connection against opening outside the hollow space 31.

The clip-on connection 50 is, furthermore, designed in such a way that it can be closed by a thrust from the drive cable 26, and can be disengaged through traction when the drive cable 26 is pulled back as soon as said traction exceeds a predetermined value. The predetermined traction force may be set through the corresponding shape of the seat 44 and the clip element 54 so that it is not exceeded when opening the second roller blind assembly 12, thus keeping the clip-on connection 50 closed. As soon as the second roller blind web 20 has arrived at the associated winding shaft 16 during opening of the second roller blind assembly 12, that is, the second roller blind web 20 is fully rolled up, a greater traction force is applied to the clip-on connection 50 through the stopping of the pulling hoop 24 at the winding shaft 16, or at an end stop, through further displacement of the drive cable 26, which leads to a disengagement of the clip-on connection 50. The clip-on connection 50 is located in the area of the hollow space 31 in this traversing section. This causes the end 38 of the drive cable 26 to be disengaged from the link 30 through the pulling hoop 24 of the second roller blind web 20. The first roller blind web 18 can then be moved further through the movement of the associated pulling hoop 22 along the remaining extension length (the difference in length between the two roller blind webs 18 and 20), until the first roller blind web 10 is also fully rolled up onto the associated winding shaft 14.

The rolling up of both roller blind webs 18 and 20 is supported by a pre-tensioning of both winding shafts 14 and 16 in winding-up direction. The two winding shafts 14 and 16 may, for example, be pre-loaded through elastic spring elements such as spiral springs in the winding shafts 14 and 16.

As already described, the roller blind system of FIGS. 1 to 5 according to the invention has the advantage that the locking mechanism is realized with an elastically deformable clip-on connection 50 that is particularly easy to manufacture. The link 30, for example, may be a single plastic injection-molded part. Alternatively it is possible to produce the link 30 in multiple parts that can be firmly attached to each other without the need to employ rotatable or displaceable elements.

The link 30 may be provided with a reinforcing insert 48 against which the clip element 54 buts up to form the clip-on connection 50. A harder material may be used for the reinforcing insert 48 at the location of impact of the expansion 42 on the link 30 so as to increase the life expectancy of the link 30. Alternatively it is possible to provide an insert made of rubber or of some other soft material as buffer against impact noises.

A further advantage results from the fact that the clip-on connection 50, starting from the open position of the roller blind system as per FIG. 1 via the closed position as per FIG. 2 and back again into the open position as per FIG. 1, always remains closed (closed by necessity due to the sizing of the guide channel 33), that is, the two ends 38 and 40 of the drive cables 26 and 28 remain solidly connected to the pulling hoop 24 of the second roller blind assembly 12 over its traversing distance. Hence the rolling-up of the second roller blind web 20 onto its associated winding shaft 16 is supported by the drive cables 26 and 28 and is carried out smoothly.

Also, the roller blind system is designed in such a way that both drive cables 26 and 28 push the second roller blind assembly 12 open, that is, they run up against the seat 44 in order to close the clip-on connection 50, so that a force in closing direction is always applied onto the clip-on connection 50 when unrolling the second roller blind web 20. An unintended disengagement during unrolling of the second roller blind web 20 is therefore not possible. Conversely, the clamping forces may be established through the choice of materials and the design of the seat 44 and its clip fingers 52 in such a way that the clip-on connection 50 only disengages when the second roller blind web 20 is fully rolled up on its associated winding shaft 16 and/or its pulling hoop 24 is locked by an end stop.

The FIGS. 6 and 7 depict two further roller blind systems for a vehicle roof with a first and a second roller blind assembly 10 and 12, which are offset to one another in longitudinal direction of the roof, and where each is provided with an associated winding shaft (not shown in detail). A roller blind web 18, 20 is allocated to each winding shaft, wherein in this instance the roller blind web 18 of the first roller blind assembly 10 is longer in extension direction than the roller blind web 20 of the second roller blind assembly 12, as in the embodiment shown in FIGS. 1 and 2. However, in this instance the first roller blind assembly 10 with the longer roller blind web 18 is disposed in driving direction behind the second roller blind assembly 12 with the shorter roller blind web 20, and thus is further away from a common drive 6 of the roller blind system than the second roller blind assembly 12.

The drive 6 of FIGS. 6 and 7, which comprises a motor 2 and a pinion 4 that is driven by said motor 2, wherein said pinion 4 moves the drive cables 26 and 58 of both roller blind assemblies 10 and 12, is also disposed in driving direction at the front of the roller blind system, like in the embodiment of FIG. 1. This provides more installation space than at the rear end of the roller blind system where the installation of the drive 6 would reduce the headroom of the rear-seat passengers.

A pulling hoop 22, 24 is disposed at each of the two free ends of the roller blind webs 18 and 20. A drive cable 26 is shown that is rigid in compression and/or is guided in a compression-resistant manner, which is engaged with a first end 34 with the pulling hoop 22 of the first roller blind assembly 10. In the embodiment shown in FIG. 6 the engagement is rigid in the sense of the definition described at the outset, that is, it is never disengaged in the normal operation of the roller blind system when rolling up or unrolling the roller blind webs 10 and 12. Nevertheless, a second clip-on connection 51 is provided, which may be opened to simplify installation or removal of the roller blind system.

A further drive cable 58 can be detachably engaged with the pulling hoop 24 of the second roller blind assembly 12 with the shorter roller blind web 20 via a clip-on connection 50. In an open position of the roller blind system, with rolled-up roller blind webs 18 and 20, an end 38 of the drive cable 58 is disengaged from the pulling hoop 24 of the second roller blind assembly 12.

In order to unroll the second roller blind web 20, the drive cable 58 is engaged with the pulling hoop 24 of the second roller blind assembly 12 after a traversing distance that essentially corresponds to the difference in length between the two roller blind webs 18 and 20. This engagement remains closed during the entire unrolling movement of the second roller blind web 20 and during the subsequent rolling up of the second roller blind web 20, through which the roller blind system is again transferred into the open position.

The engagement and disengagement of the drive cable 58 with/from the pulling hoop 24 of the second roller blind assembly 12 again occurs automatically via an elastically deformable clip-on connection 50. However, since in the embodiments of FIGS. 5 and 6 (in contrast to the embodiment of FIG. 1) the shorter roller blind web 18 is disposed at the rear, but the drive 2 is disposed at the front of the roller blind system, the clip-on connection 50 comprises a redirection by 180°.

The elastically deformable clip-on connection 50 is designed in such a way that the end 38 of the drive cable 58 can be detachably engaged with the pulling hoop 24 of the second roller blind assembly 12.

Both FIGS. 6 and 7 depict a link 30 for connecting the end 38 of the drive cable 58 with the assigned pulling hoop 24 of the second roller blind assembly 12. The link 30 comprises a seat 44, which may be designed in the same way as the seat 44 in the preceding figures.

Due to the redirection of the elastic clip-on connection 50 in FIGS. 6 and 7 in the vicinity of the clip element 54 of link 30 by essentially 180°, the first, longer roller blind web 18 may be pushed by the drive cable 26 into a closed position with an unrolled first roller blind web 18, and may be pulled into an open position with a first roller blind web 18 rolled up. The second, shorter roller blind web 20 is pulled by the second drive cable 58 into a closed position with an unrolled, second roller blind web 20, and pushed into an open position with a rolled-up second roller blind web 20. Both drive cables 26 and 58 are moved synchronously by pinion 4 of drive 6 which, as an alternative, makes it possible to use a single, continuous drive cable (as shown in FIGS. 1 and 2).

The redirection is designed such that the clip element 54 in the embodiments of FIGS. 6 and 7 extends in the direction of the seat 44 of the clip-on connection 50 parallel to the adjacent drive cable 58, that is, from the end 38 at which the clip element 54 is disposed, to the middle of the drive cable 58. To close the clip-on connection 50, the clip element 54 is pulled into the seat 44, whereas in the embodiment of FIGS. 1 and 2 the corresponding clip element 54 shown there is pushed into the seat 44.

The terms "pushing" and "pulling" are to be generally understood as a movement of components that is realized through thrust or traction respectively applied to a drive cable.

SEQUENCE LISTING

2 Motor
4 Pinion
6 Drive
10 First roller blind assembly
12 Second roller blind assembly
14, 16 Winding shafts
18 First roller blind web
20 Second roller blind web
22, 24 Pulling hoop
26, 28 Drive cable
30 Pulling hoop link
31 Hollow space 32 Transition tube
33 Guide channel
34, 36 Ends of the drive cables
38, 40 Ends of the drive cables
42 Expansion
43 First section of 33
44 Seat
45 Second section of 33
46 Undercut
47 Opening dimension of 45
48 Reinforcing insert
50 Clip-on connection
51 Second clip-on connection
52 Clip finger
54 Clip element
56 Constriction
58 Drive cable

The invention claimed is:

1. A roller blind system for a vehicle roof, comprising:
a first and a second roller blind assembly, which are disposed offset to each other in longitudinal direction of the roof, each of which being provided with a winding shaft, and each with an associated roller blind web that may be wound up,
wherein the roller blind web of the first roller blind assembly is provided longer in extension direction than the roller blind web of the second roller blind assembly, as well as two pulling hoops each attached to free ends of the two roller blind webs, and
at least one compression-resistant drive cable driven by a drive, which is firmly attached with a first section with the pulling hoop of the first roller blind assembly, and is detachably engaged with a second section with the pulling hoop of the second roller blind assembly,
wherein, for the purpose of unrolling the second roller blind web, the drive cable, beginning from a disengaged state, is engaged with its second section with the pulling hoop of the second roller blind assembly, and is disengaged again after a further complete rolling up of the second roller blind web for the purpose of further rolling up the first roller blind web with its second section from the pulling hoop of the second roller blind web,
wherein the engagement and disengagement take place automatically by a locking mechanism, and
wherein the locking mechanism is provided with an elastically deformable clip-on connection by which the second section of the drive cable is detachably engaged with the pulling hoop of the second roller blind assembly.

2. The roller blind system according to claim 1, wherein in a section of the second roller blind assembly the closed clip-on connection is guided inside a guide channel, which is sized at least in sections so that the engaged clip-on connection is unable to open in this section.

3. The roller blind system of claim 1, wherein the two sections are located at the two ends of the drive cable.

4. The roller blind system of claim 1, wherein the drive cable remains engaged with its second section with the pulling hoop of the second roller blind assembly in the partially and fully unrolled state of the second roller blind web.

5. The roller blind system of claim 1, wherein two compression-resistant drive cables are provided, which are jointly driven in the opposite direction by the drive, wherein each engages at opposite, lateral ends of the respective pulling hoop via the first or second sections respectively.

6. The roller blind system of claim 1, wherein the second section moves in the opposite direction to the first section, and both roller blind assemblies are extended in opposite direction to each other.

7. The roller blind system of claim 1, wherein the first roller blind web is pulled by the drive cable into a closed position with an unrolled, first roller blind web.

8. The roller blind system of claim 1, wherein the first roller blind web is pushed by the drive cable into an open position with a rolled-up, first roller blind web.

9. The roller blind system of claim 1, wherein the second roller blind web is pushed by the drive cable into a closed position with an unrolled, second roller blind web.

10. The roller blind system of claim 1, wherein the second roller blind web is pulled by the drive cable into an open position with a rolled-up, second roller blind web.

11. The roller blind system of claim 1, wherein both winding shafts are preloaded in a rolling-up direction by means of spring elements.

12. The roller blind system of claim 1, wherein the elastically deformable clip-on connection is provided with an expansion, which is received in a seat of the clip-on connection for the purpose of a detachable engagement, wherein the seat is elastically deformed and wherein the seat is an injection-molded plastic part.

13. The roller blind system of claim 12, wherein the expansion is disposed on the second section of the drive cable, or is connected with the pulling hoop of the second roller blind assembly, and the seat is provided in form of an elastically expandable opening with an undercut, which is correspondingly connected with the pulling hoop of the second roller blind assembly or is disposed on the second section of the drive cable.

14. The roller blind system of claim 12, wherein the closed clip-on connection is guided inside a guide channel in a section of the second roller blind assembly, wherein in front of and/or in a guide channel first section, which faces the first roller blind assembly, a hollow space is provided that has an opening dimension of a size that allows the clip-on connection to open, and the guide channel is of a size in the second section, which follows the first section, that the closed clip-on connection is unable to open.

15. The roller blind system of claim 14, wherein an opening dimension of the second section corresponds essentially to the diameter of the closed clip-on connection so that the opening of the clip-on connection through bending up of clip fingers radially outwards is prevented.

16. The roller blind system of claim 1, wherein the elastically deformable clip-on connection is designed such that it can be disengaged under a reversible, elastic deformation through a force that can be applied by the drive.

17. The roller blind system of claim 1, wherein two compression-resistant drive cables are provided, which are jointly driven by the drive in the opposite direction, each of which engages with the opposite, lateral ends of the associated pulling hoop via the first or second sections respectively.

18. The roller blind system of claim 1, wherein two compression-resistant drive cables are provided, and both drive cables are redirected twice by 90° each, wherein both drive cables together have a U-shaped configuration in top view, and wherein the drive located in the connecting section between the two "flanks" of the U drives the drive cables.

19. The roller blind system of claim 18, wherein the drive is disposed on that side of the roller blind system to which the pulling hoop of the first roller blind web is moved when the first roller blind web is unrolled.

20. The roller blind system of claim 1, wherein the drive cable is routed in a section between the first roller blind assembly and the second roller blind assembly inside a transition tube.

21. The roller blind system of claim 20, wherein the transition tube is oriented such that it centers the second section of the drive cable in such a way that the clip-on connection is closed when pushing the drive cable forward in the direction of the second roller blind assembly.

22. A roller blind system for a vehicle roof, comprising:
a first and a second roller blind assembly, which are disposed offset to each other in longitudinal direction of the roof, each of which being provided with a winding shaft, and each with an associated roller blind web that may be wound up,
wherein the roller blind web of the first roller blind assembly is provided longer in extension direction than the roller blind web of the second roller blind assembly, as well as two pulling hoops each attached to free ends of the two roller blind webs, and
at least one compression-resistant drive cable driven by a drive, which is firmly attached with a first section with the pulling hoop of the first roller blind assembly, and is detachably engaged with a second section with the pulling hoop of the second roller blind assembly,
wherein, for the purpose of unrolling the second roller blind web, the drive cable, beginning from a disengaged state, is engaged with its second section with the pulling hoop of the second roller blind assembly, and is disengaged again after a further complete rolling up of the second roller blind web for the purpose of further rolling up the first roller blind web with its second section from the pulling hoop of the second roller blind web,
wherein the engagement and disengagement take place automatically by a locking mechanism,
wherein the locking mechanism is provided with an elastically deformable clip-on connection by which the second section of the drive cable is detachably engaged with the pulling hoop of the second roller blind assembly, and
wherein the elastic clip-on connection is provided with a redirection, and that the first roller blind web is pushed by a first drive cable into a closed position with an unrolled, first roller blind web, and is pulled into an open position with a rolled-up, first roller blind web, and that the second roller blind web is pulled by a second drive cable into a closed position with an unrolled, second roller blind web and is pushed into an open position with a rolled-up, second roller blind web.

23. The roller blind system of claim 22, wherein a clip element, which is disposed at an end of the second drive cable, is pulled into a seat at the pulling hoop of the second roller blind assembly in order to close the clip-on connection.

24. The roller blind system of claim 22, wherein the redirection is designed such that a clip element of the clip-on connection, which is disposed at an end of the second drive cable, extends in the direction of a seat of the clip-on connection, which is disposed on the pulling hoop of the second roller blind assembly, and extends parallel to the second drive cable, that is, from the end to the middle of the second drive cable.

25. The roller blind system of claim 24, wherein a further clip-on connection is provided through which, under normal operation of the roller blind system, a firm attachment of the drive cable with the pulling hoop of the first roller blind assembly is realized, which is disengaged for the installation and removal of the roller blind system.

26. The roller blind system of claim 1, wherein a further clip-on connection is provided through which, under normal operation of the roller blind system, a firm attachment of the drive cable with the pulling hoop of the first roller blind assembly is realized, which is disengaged for the installation and removal of the roller blind system.

27. The roller blind system of claim 26, wherein the further clip-on connection is disposed in the vicinity of the clip-on connection.

* * * * *